(No Model.) 2 Sheets—Sheet 1.
W. F. COOK.
PHOTOGRAPHIC CAMERA SHUTTER.
No. 590,752. Patented Sept. 28, 1897.
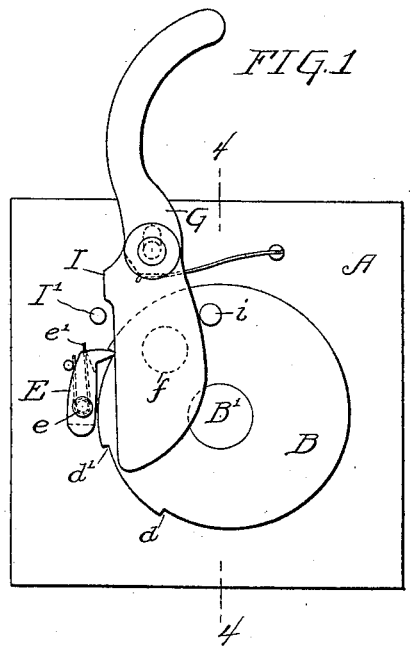
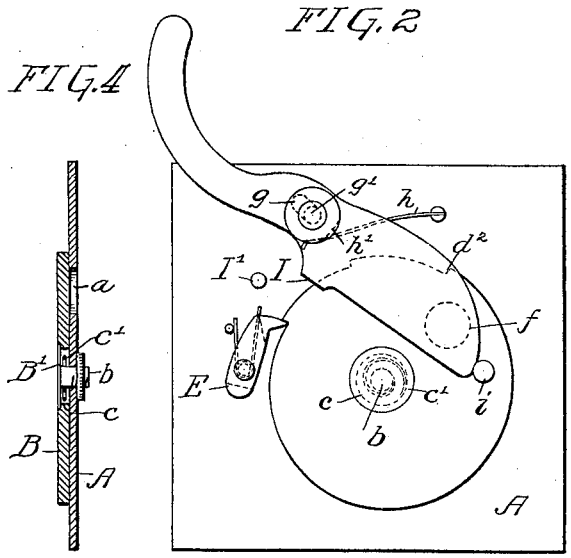
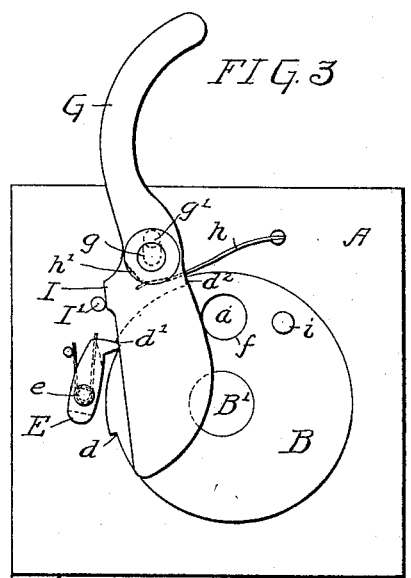
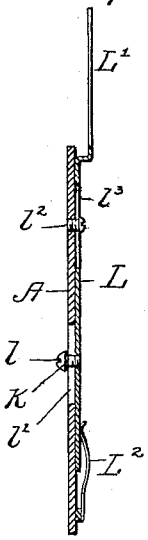
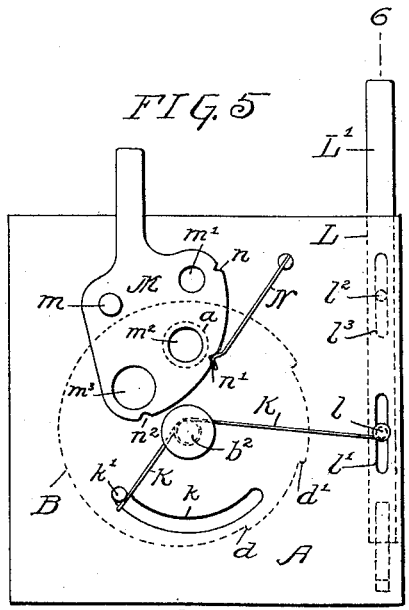
Witnesses:
Jno. E. Parker
Robert J. Arundel
Inventor:
William F. Cook
by his Attorney.
Walter S. Calmore (No Model.) 2 Sheets—Sheet 2.
W. F. COOK.
PHOTOGRAPHIC CAMERA SHUTTER.
No. 590,752. Patented Sept. 28, 1897.
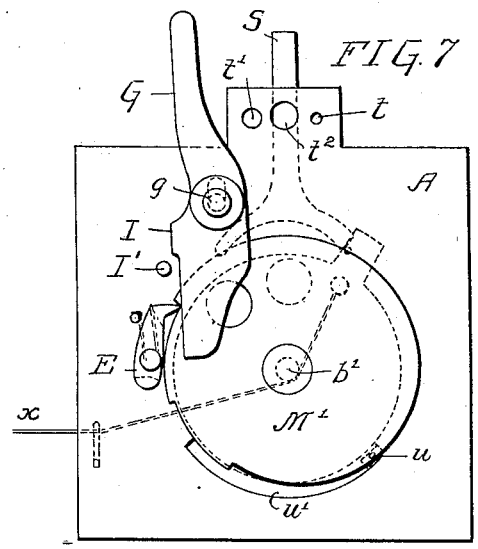
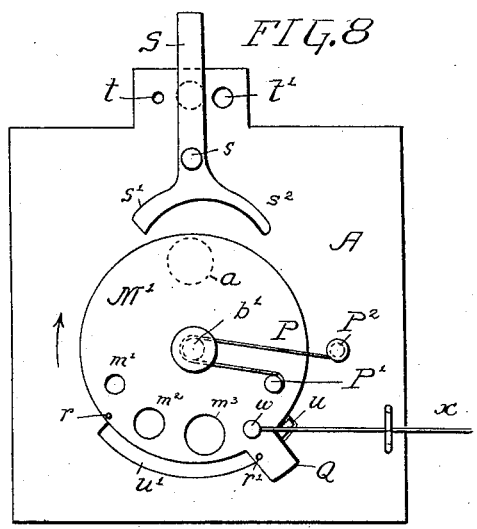
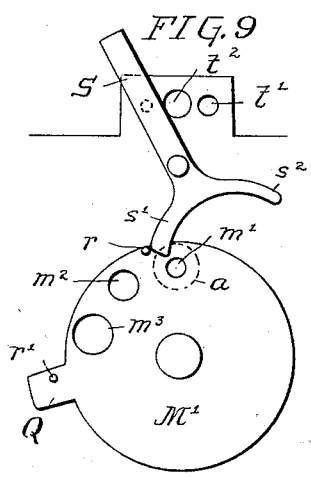
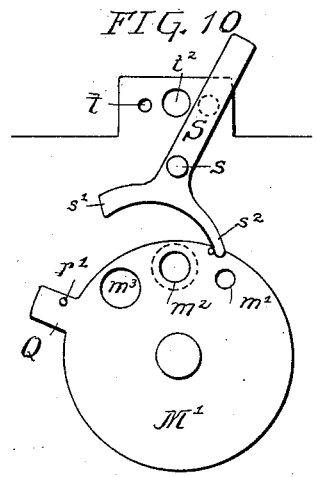
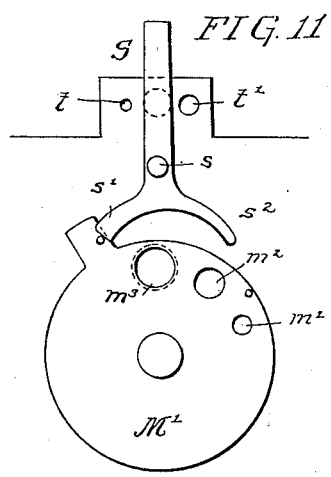
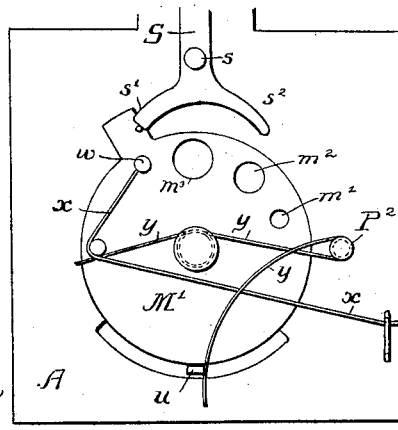

UNITED STATES PATENT OFFICE.

WILLIAM F. COOK, OF IVY MILLS, PENNSYLVANIA.

PHOTOGRAPHIC-CAMERA SHUTTER.

SPECIFICATION forming part of Letters Patent No. 590,752, dated September 28, 1897.

Application filed November 7, 1896. Serial No. 611,354. (No model.)

*To all whom it may concern:*

Be it known that I, WILLIAM F. COOK, a citizen of the United States, residing at Ivy Mills, in the county of Delaware and State of Pennsylvania, have invented certain new and useful Improvements in Photograph-Camera Shutters, of which the following is a specification, reference being had therein to the accompanying drawings.

My invention relates to certain improvements in camera-shutters, and has for its object to provide an improved form of shutter for making both instantaneous and time exposures, as more fully set forth hereinafter.

In the accompanying drawings, Figure 1 is an elevation of a shutter mechanism constructed in accordance with my invention. Figs. 2 and 3 are similar views of the same, showing the parts in different positions. Fig. 4 is a sectional elevation of the same on the line 4 4, Fig. 1. Fig. 5 is a rear view. Fig. 6 is a sectional elevation on the line 6 6, Fig. 5. Fig. 7 is an elevation of a shutter mechanism of slightly-modified construction. Fig. 8 is a rear view of the same. Figs. 9, 10, and 11 are fragmentary views showing a part of the stop or diaphragm disk in different positions; and Fig. 12 is a rear elevation of the shutter, showing a further modification.

Referring to the drawings, A represents the base-plate of the shutter, in which is formed a circular opening $a$ in line with the lens of the camera. At about the center of the base-plate is a bolt $b$, having an enlarged flattened head B', which fits into a correspondingly-shaped depression in the outer face of the shield B. The center of the shield has an enlarged circular opening $c$, and in the wall of said opening is secured one end of a spiral spring $c'$, the opposite end of which is secured to the bolt $b$ and serves to keep the shield in its normal inactive position, Fig. 1.

On the periphery of the shield B are three detents in the form of ratchet-teeth $d\ d'\ d^2$, with which a pawl E is adapted to engage. The pawl E is pivoted to a pin $e$ and is acted upon by a spring $e'$, which serves to keep it in contact with the teeth of the shield B.

In the shield B is a circular opening $f$, so arranged with respect to the teeth that when the second or middle tooth $d'$ is held by the pawl said opening will be immediately opposite the opening $a$ in the base-plate, as shown in Fig. 3, and when either of the other teeth is engaged by the said pawl said opening will be either in the position illustrated in Fig. 1 or that illustrated in Fig. 2.

On the base-plate is pivoted a lever G, the lever being slotted at $g$, so that it may move vertically on its pivot-pin $g'$, but being normally held in the highest position by means of a spring $h$, which bears against flattened faces $h'$ on the under side of the lever. The lower portion of the lever is comparatively broad, so that it will cover the opening in the shield B, and one side of said lever is curved to form a cam for engagement with a pin $i$ on the shield. The opposite side of said lever is straight and near its pivot-point has a projection I, which when the lever is depressed to the position shown in Fig. 3 will come into contact with a stop-pin I' on the base-plate A.

The operation of the mechanism described is as follows: With the parts in the position shown in Fig. 1, or the normal position, it is desired to take a picture by a time exposure. The lever G is operated in such manner as to engage the pin $i$ and move the shield to the position shown in Fig. 2, the pawl E being then in engagement with the lowest tooth $d^2$ of the shield and holding the same when the lever returns to the position shown in Fig. 1. It will be observed that the broad surface of the lever G covers the opening in the shield during the time that the opening is passing the opening $a$ in the base-plate and prevents a premature exposure. The lever is then depressed to the position shown in Fig. 3 until its projection I is in contact with or rather opposite the stop-pin I', when the flat side of the lever is moved against the pawl E and presses the same out of contact with the tooth $d^2$, permitting the spring $c'$ to move the shield, but only so far as to permit the opening $f$ of the shield and the opening $a$ of the base-plate to come into alinement. The projection I being in contact with the pin I' prevents a movement of the lever G sufficient to move the pawl back to its farthest position, but only so far as to make the pawl engage with the middle tooth $d'$ and hold the shield in mid-position. The parts are then in the relative positions shown in Fig. 3. The lever G is then released and rises to the position shown in Fig. 1, and the openings in the shield and base-plate are permitted to remain in line with each other for a sufficient length of time to take the picture, when the lever G is moved to push the pawl out of engagement with the tooth $d'$ and permit the spring $c'$ to move the shield to the initial position, Fig. 1.

When an instantaneous picture is to be taken, the parts are moved to the position shown in Fig. 2, and then the pawl E is disengaged from the tooth $d^2$ by simply moving the lever G against it without depressing said lever. This will move the pawl fully back and permit the shield to move back until the pawl E engages the tooth $d$, the opening in the shield quickly passing the opening $a$ of the base-plate and making an instantaneous exposure.

For the purpose of regulating the speed with which the shield travels in making an instantaneous exposure I employ the construction illustrated in Fig. 5, the base-plate A having a segmental slot $k$, through which extends a pin $k'$, secured to the rear side of the shield B, the pin being acted upon by a spring K, which is turned around the pivot-pin $b^2$ of the shield and has its opposite end secured to a pin or screw $l$, carried by a slide L and passing through a slot $l'$ in the base-plate. This slide L is suitably guided on the face of the plate partly by the screw $l$ and slot $l'$ and partly by a second screw $l^2$, carried by the base-plate and projecting into a slot $l^3$ in the slide. The upper end of the slide has a handle L', and its lower end is pressed upon by a flat spring $L^2$, secured to the base-plate and adapted to bear with some little force upon the slide, so that it will hold the latter in any position to which it may be adjusted. By moving this slide vertically the tension of the spring K may be increased or diminished and the force with which it acts upon the shield may be regulated to cause the latter to travel at a slow or a fast rate of speed, in accordance with the desired time of exposure.

In Fig. 5 is also shown a simple form of stop-disk M, pivoted at $m$ and provided with a number of different-sized openings $m'$ $m^2$ $m^3$, any one of which may be brought opposite the opening $a$ in the base-plate. The edge of the disk has three notches $n$ $n'$ $n^2$, with which may engage a holding spring or detent N to hold the stop-disk in any position to which it may be adjusted.

Referring now to Figs. 7 and 8, the base-plate, shield, and holding-pawl are similar to those previously described, but the manner of "setting" the shutter is altered to suit a different style of camera where the setting of the shutter is accomplished by a pull string or wire. The spring for holding the shield may be of the character illustrated in Figs. 2 and 4 or that shown in Fig. 5.

On the rear face of the base-plate on a pin or bolt $b'$ is mounted a stop or diaphragm disk M', having three "stops" or openings $m'$ $m^2$ $m^3$, any one of which may be brought into line with the opening $a$ in the base-plate, the disk being held in its normal position by a spring P, curled around the bolt $b'$ and having one end secured to a fixed pin $P^2$ on the base-plate and its opposite end attached to a pin P' on the disk, the tendency of the spring being at all times to turn the disk in the direction of the arrow, Fig. 8. On the disk is a pin $r$, and on a projection Q, extending from the periphery of the disk, is a similar pin $r'$. To the base-plate is pivoted at $s$ a lever S, having two fingers or prongs $s'$ $s^2$. This lever may be moved to any one of the positions shown in Figs. 9, 10, and 11, its position being indicated to the operator by a guide-plate T, which projects outside the camera-casing and has three openings $t$ $t'$ $t^2$, the opening $t$ being the smallest, the opening $t^2$ the largest, and the opening $t'$ the medium size. When the lever is moved opposite one or other of these openings, the stop plate or disk M' will stop in such position that its correspondingly smaller or larger or medium size stop-opening will be in line with the opening $a$ in the base-plate A.

When the lever S is moved to the position shown in Fig. 9, it is opposite the smallest opening $t$, and when the stop-disk M' is moved by its spring the pin $r$ will be engaged by the finger $s'$ and the smallest opening $m'$ in the disk will stop opposite the opening $a$ in the base-plate.

When the lever S is in the position shown in Fig. 10, (opposite the medium-size opening $t'$,) the pin $r$ will be engaged by the finger $s^2$ and the disk will stop in such position that its medium-size opening $m^2$ will be opposite the opening $a$ in the base-plate, and when the lever is in the position shown in Fig. 11 the pin $r'$ will be engaged by the finger $s'$ and the large opening $m^3$ will stop opposite the opening $a$, so that the operator may at all times adjust his stops to suit the varying conditions under which the pictures are taken.

The shield B is provided with a pin $u$, which projects through a segmental slot $u'$ in the base-plate in the path of the projection Q of the disk M', and to a pin $w$ on the disk is secured a cord $x$, which passes out through an opening in the camera-casing.

To "set" the shutter, the cord $x$ is pulled and the disk moves in a direction opposite to that indicated by the arrow, Fig. 8, until the projection Q meets the pin $u$, and the movement continuing the shield B is turned until the pin $u$ reaches the end of the slot $u'$, Fig. 8, when the shield will have reached such position that the pawl E will engage the last tooth $d$ on said shield. The cord may then be released and the disk M' will be returned by its spring to whatever position may be called for by the position of the lever S.

To release the shutter for instantaneous or time exposures, the operation of the lever G is the same as previously described.

In both the constructions shown in Figs. 1 and 7 the shield may be moved when a time exposure is to be made directly to a point where the pawl E engages with the tooth $d'$, when the shield-opening will be directly in line with the opening $a$ in the base-plate, but the operation as above described is deemed the more desirable, as the time of exposure can be more accurately determined.

In the construction shown in Fig. 12 the parts are substantially the same as previously described, but a single spring $y$ serves to keep both the shield and the disk $M'$ in proper normal position.

Having thus described my invention, what I claim, and desire to secure by Letters Patent, is—

1. A camera-shutter comprising a base-plate having an exposure-opening, a rotatable shield having an opening which may be moved across the exposure-opening, teeth in the edge of said shield, a pivoted pawl adapted to engage said teeth, and a lever having a broad face adapted at times to cover the exposure-openings, said lever being so arranged as to set the shield when moved in one direction and when moved in the opposite direction to release the pawl and permit the operation of the shutter.

2. The combination in a camera-shutter, of a base-plate having an exposure-opening, a rotatable shield having an opening which may be moved across the exposure-opening, teeth in the edge of said shield, a pivoted pawl adapted to engage said teeth, a broad-faced lever adapted to engage said pawl, a fixed stop for said lever, said lever being adjustable and adapted to make contact at different points with the said stop and pawl to permit a partial or complete movement of the latter and so govern the extent of movement of the shield.

3. A camera-shutter having in combination, a base-plate provided with an exposure-opening, a rotatable shield having an opening which may be moved across the exposure-opening, teeth in the edge of said shield, a pawl adapted to engage said teeth, means for setting the shield, an adjustable slotted lever adapted to operate on the pawl, a projection on said lever, and a fixed stop with which said projection may be moved into contact to limit the movement of the pawl.

4. A camera-shutter comprising a base-plate having an exposure-opening, a rotatable shield having an opening which may be moved across the exposure-opening, teeth in the edge of said shield, a pawl adapted to engage said teeth, means for setting the shield, a pin $g$ on the base-plate, a slotted lever G mounted on said pin, a projection I on said lever, and a fixed stop I' on the base-plate adapted to be engaged by said projection.

5. A camera-shutter comprising a base-plate having an exposure-opening, a rotatable shield having an opening which may be moved across the exposure-opening, teeth in the edge of said shield, a pawl adapted to engage said teeth, a pin on said shield, a lever having a broad face adapted to act on said pin to set the shield and upon the pawl to release the same.

6. A camera-shutter comprising a base-plate having an exposure-opening, a rotatable shield having an opening which may be moved across the exposure-opening, teeth in the edge of said shield, a pawl adapted to engage said teeth, means for setting and releasing said shield, a spring tending to keep the shield in its normal position, and an adjustable carrier for one end of said spring arranged in such manner as to permit of the adjustment of the tension of the spring to alter the speed of travel of the shutter.

7. A camera-shutter comprising a base-plate having an exposure-opening, a rotatable shield having an opening which may be moved across the exposure-opening, teeth in the edge of said shield, a pawl adapted to engage the said teeth, means for releasing the pawl, a stop-disk having projecting pins thereon, and an adjustable arm adapted to engage said pins.

8. A camera-shutter comprising a base-plate having an exposure-opening, a rotatable shield having an opening which may be moved across the exposure-opening, teeth in the edge of said shield, a pawl adapted to engage said teeth, means for releasing the pawl, a stop-disk, pins thereon, a lever S adapted to engage said pins, and a guide for said lever.

9. The combination of the base-plate having an exposure-opening, a rotatable shield having an opening which may be moved across the exposure, a pivoted stop-disk operatively connected to and movable with the shield, means for rotating the stop-disk, and an adjustable lever for limiting the movement of said stop-disk, substantially as specified.

In testimony whereof I affix my signature in the presence of two witnesses.

WILLIAM F. COOK.

Witnesses:
RUSSELL T. BOSWELL,
WALTER W. CALMORE.